(12) United States Patent
Loos

(10) Patent No.: US 11,368,074 B2
(45) Date of Patent: Jun. 21, 2022

(54) ROTOR AND METHOD FOR PRODUCING A ROTOR

(71) Applicant: Bayerische Motoren Werke Aktiengesellschaft, Munich (DE)

(72) Inventor: Daniel Loos, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 87 days.

(21) Appl. No.: 16/957,588

(22) PCT Filed: Jan. 29, 2019

(86) PCT No.: PCT/EP2019/052048
§ 371 (c)(1),
(2) Date: Jun. 24, 2020

(87) PCT Pub. No.: WO2019/162047
PCT Pub. Date: Aug. 29, 2019

(65) Prior Publication Data
US 2020/0336050 A1    Oct. 22, 2020

(30) Foreign Application Priority Data
Feb. 21, 2018   (DE) ..................... 10 2018 202 624.6

(51) Int. Cl.
*H02K 13/00*   (2006.01)
*H02K 13/02*   (2006.01)
*H02K 15/00*   (2006.01)

(52) U.S. Cl.
CPC ......... *H02K 13/02* (2013.01); *H02K 15/0068* (2013.01)

(58) Field of Classification Search
CPC .......... H02K 3/528; H02K 13/02; H02K 3/50; H02K 3/28; H02K 3/38; H02K 2203/09;
(Continued)

(56) References Cited

U.S. PATENT DOCUMENTS 3,355,801 A     12/1967  Priddy
4,114,056 A  *   9/1978  Nimura .............. H02K 15/0062
                                                    310/71

(Continued)

FOREIGN PATENT DOCUMENTS

CN   104040848 A    9/2014
CN   106464096 A    2/2017
(Continued)

OTHER PUBLICATIONS

WO-2014061073-A1 machine translation Dec. 4, 2021.*
(Continued)

*Primary Examiner* — Quyen P Leung
*Assistant Examiner* — Leda T Pham
(74) *Attorney, Agent, or Firm* — Crowell & Moring LLP

(57) ABSTRACT

The invention relates to a rotor for an electric machine, comprising at least one first (22) and a second (32) conductor end and a contact element, which provides a connection between the at least two conductor ends (22, 32), and wherein the contact element can be positioned along a rotor axis (R) of the rotor in such a way that the connection can be established in an intermediate position, which is offset away from the rotor in relation to an end position of the contact element.

11 Claims, 3 Drawing Sheets

(58) Field of Classification Search
CPC .... H02K 5/225; H02K 3/522; H02K 15/0068; H02K 1/185; H02K 1/148; H02K 7/006; H02K 17/22; H02K 15/09; B60L 7/12; B60L 50/16
See application file for complete search history.

(56) References Cited

U.S. PATENT DOCUMENTS

| | | | |
|---|---|---|---|
| 2004/0017128 A1 | 1/2004 | York et al. | |
| 2005/0285459 A1* | 12/2005 | Ishida | H02K 9/28 310/62 |
| 2014/0246934 A1 | 9/2014 | Egami et al. | |
| 2014/0300218 A1 | 10/2014 | Shinosaka et al. | |
| 2017/0141657 A1* | 5/2017 | Minami | B60L 1/00 |
| 2017/0163118 A1 | 6/2017 | Kimpara | |
| 2017/0163120 A1 | 6/2017 | Chae et al. | |
| 2017/0163121 A1 | 6/2017 | Park et al. | |

FOREIGN PATENT DOCUMENTS

| | | |
|---|---|---|
| CN | 106936240 A | 7/2017 |
| DE | 9116310 U1 | 9/1992 |
| DE | 10 2009 040 106 A1 | 3/2011 |
| DE | 10 2013 114 688 A1 | 6/2015 |
| DE | 10 2016 122 534 A1 | 6/2017 |
| DE | 10 2016 212 402 A1 | 6/2017 |
| JP | 52-118206 A | 10/1977 |
| JP | 63-194548 A | 8/1988 |
| JP | 7-27275 U | 5/1995 |
| JP | 2008-236934 A | 10/2008 |
| WO | WO-2014061073 A1 * 4/2014 ............... H02K 3/38 |

OTHER PUBLICATIONS

International Search Report (PCT/ISA/210) issued in PCT Application No. PCT/EP2019/052048 dated Mar. 21, 2019 with English translation (seven (7) pages).

German-language Written Opinion (PCT/ISA/237) issued in PCT Application No. PCT/EP2019/052048 dated Mar. 21, 2019 (six (6) pages).

German-language Search Report issued in German Application No. 10 2018 202 624.6 dated Dec. 17, 2018 with partial English translation (12 pages).

English-language Office Action issued in Chinese Application No. 201980007010.9 dated Dec. 7, 2021 (10 pages).

* cited by examiner

ROTOR AND METHOD FOR PRODUCING A ROTOR

BACKGROUND AND SUMMARY OF THE INVENTION

The present invention relates to a rotor for an electric machine, to an electric motor, and to a method for producing a rotor.

In connection with the production of rotors, it is generally necessary for electrical conductors, such as for example winding ends, etc., to be connected to one another. Wound rotors, as are used in current-excited synchronous machines, have a slip ring module which provides a connection between the winding and corresponding contact points, such as for example brushes. In the production of rotors, in particular the connection of the winding to the slip ring module proves to be complicated, since there is often not enough space or structural space available for the engagement of the tools required for the connection, for example a crimping tool. DE 10 2016 212 402 A1 addresses this problem and proposes a rotor having a slip ring module which is fastened to a portion of a rotary shaft of the rotor, wherein the slip ring module has a terminal fastening portion and a welding terminal which is fastened to an outer circumferential surface of the terminal fastening portion and which is connected to the rotor coil, wherein the welding terminal is connected to the rotor coil within a range of a width of the terminal fastening portion and absorbs a welding pressure in a direction which is perpendicular to a surface which contains an axial direction of the rotary shaft. However, with regard to the connection process, specifically welding, this variant is significantly limited. In addition, this solution does not appear to be optimal with regard to the structural space.

It is therefore an object of the present invention to specify a rotor, an electric motor and a method for producing a rotor which permit good accessibility during contacting and at the same time require little structural space.

According to the invention, a rotor for an electric machine comprises at least one first conductor end and one second conductor end and a contact element which provides a connection between the at least two conductor ends, and wherein the contact element is able to be positioned, or able to be arranged, at least along a rotor axis of the rotor such that the connection can be realized in an intermediate position which, in relation to an end position of the contact element, is directed or offset away from the rotor. In particular, connection of the two conductor ends to, or contacting thereof with, the contact element is therefore realized in a manner offset away from the rotor, which makes possible very good accessibility for tools required in this case, for example a welding tool or a crimping tool. The offset between the end position and the intermediate position may be in a range of several millimeters, for example 5-15 mm, in particular for example in a range of approximately 10 mm. With regard to the "connection" of the conductor elements to the contact element, owing to the good accessibility, it is possible for use to be made of a very wide variety of methods, for example (hot) crimping, soldering, welding, etc. According to a preferred embodiment, the contact element is arranged in or on the rotor so as to be displaceable, in particular axially displaceable, that is to say is, through the rotor, guided along the rotor axis and/or else held.

The contact element is expediently arranged in or on the rotor in the end position, wherein said contact element is advantageously held in a form- and/or force-fitting manner. Preferably, the contact element is pushed into the end position after the connection to the conductor element. According to one embodiment, said contact element is for example clipped in or inserted at the end position. In this case, the conductor ends connected to the contact element are, at least in part, likewise also displaced.

According to a preferred embodiment, the first conductor end is a winding end of a winding of the rotor, with the second conductor end being a terminal of a slip ring module. Expediently, two first conductor ends and two second conductor ends are provided. The winding comprises for example two winding ends, and the slip ring module comprises two terminals, which have to be connected to one another accordingly. Two contact elements are expediently also provided accordingly. The rotor advantageously comprises a slip ring module which, in the intermediate position, is connected via the two contact elements to the winding ends of the winding of the rotor and which, after the connection, is displaced or has been displaced along an arrangement direction, directed toward the rotor, into the end position together with the contact elements. Due to the pushing-together to the end position in particular, the proposed solution is extremely compact and structural space-saving, but at the same time, due to the intermediate position, which is as it were displaced away from the rotor, allows extremely good accessibility for the contacting of the slip ring module.

According to one embodiment, the contact element has a guide element which is arranged in a receptacle of the rotor. The contact element is therefore expediently guided along the rotor axis of the rotor, in particular guided, or held, in a form-fitting manner. This advantageously also allows pre-fitting. In this regard, the rotor may be equipped with the corresponding number of contact elements, possibly also before the winding of the rotor. An arrangement of the slip ring module at a later stage should be mentioned as being particularly advantageous, since said component is somewhat obstructive during the winding process for space reasons.

According to one embodiment, the contact element has at least one support element or comprises such a support element, wherein the support element is designed to hold or to arrest the contact element in the intermediate position, in particular along the rotor axis and in particular directed toward the rotor. The support element in particular makes it possible for an axial position of the contact element with respect to the rotor or with respect to the rotor axis to be predefined, wherein this advantageously allows or promotes prefitting of the contact element (or of multiple contact elements). Expediently, the aforementioned receptacle has at least one corresponding holding surface or one holding portion, which is designed to interact with the support element such that the contact element is held, in particular along the arrangement direction, in the intermediate position. According to one embodiment, the holding surface is formed as a planar or flat portion which extends transversely or substantially transversely with respect to the axis of rotation, wherein the support element is formed in a manner congruent thereto. Advantageously, the support element may, as viewed toward the rotor, be supported on the holding surface along the axis of rotation.

According to one embodiment, the contact element has two fastening portions for arrangement with and connection to the first conductor end and the second conductor end, wherein the fastening portions are of deformable design. According to a preferred embodiment, the fastening portions are formed in the shape of a bowl. The bowl shape or a U shape advantageously permits a simple arrangement, in particular a placement of the conductor ends therein. A contact element designed in this manner is expediently crimped to the conductor ends, wherein the aforementioned fastening portions are in this case deformed. This has the effect that the support elements also no longer bear against the corresponding holding portions or holding surfaces, with the result that the contact element is no longer arrested in the intermediate position but can be pushed to the end position.

The receptacle advantageously has two or at least two corresponding receptacle portions for the fastening portions, or forms such receptacle portions. According to one embodiment, the fastening portions are formed such that the fastening portions are able to be arranged in the receptacle portions, in particular inserted therein, only in the deformed state.

According to one embodiment, the receptacle(s) is/are formed in a face-side insulation of the rotor. The rotor advantageously has a face, star-shaped or end disk, wherein the receptacle(s) is/are formed in the face-, star-shaped- or end-disk insulation. According to a preferred embodiment, said insulation is produced by injection molding. Therefore, expediently, in the end position, the slip ring module is inserted into the star-shaped-disk insulation or the contact elements are pressed into the receptacle portions.

According to one embodiment, the rotor, or in particular the aforementioned insulation, has at least one extension, which is designed to deflect the conductor ends, in particular the winding ends, such that a relief of tension occurs when the displacement from the intermediate position to or into the end position is realized, the conductor portion, in particular the wire, not becoming more stretched or slack however. The extensions are expediently directed counter to the arrangement direction of the rotor.

The invention is also directed toward an electric motor comprising a rotor according to the invention. The electric motor is preferably a current-excited synchronous motor, such as is used for example in hybrid or electric vehicles in the motor vehicle sector.

The invention is furthermore directed toward a method for producing a rotor, comprising the steps of:

winding a rotor, wherein the rotor has at least one first conductor end and one second conductor end;

connecting the at least two conductor ends to a contact element, wherein the contact element is in this case positioned in an intermediate position with respect to a rotor axis of the rotor;

displacing the contact element in the direction of the rotor into an end position after and/or during connection.

The offset counter to the rotor, or away therefrom, of the intermediate position in relation to the end position is optimal for the connection of the contact element to, or the contacting thereof with, the conductor ends or the conductors. The connection may be realized in a very wide variety of ways, as already mentioned above. In addition, the connection may be realized both by hand and by machine, for example also by means of a robot. The pushing-together, in other words the displacement of the contact element, together with the conductor ends, from the intermediate position into the end position, significantly reduces the structural space requirement, in particular as far as the length of the rotor is concerned. The winding of the rotor is advantageously realized before the slip ring module is arranged. In other words, the slip ring module is not in an installed state or preinstalled state during the winding, and thus advantageously not in the way during the winding.

According to one embodiment, the method comprises the steps of:

arranging a slip ring module on or against the rotor in the intermediate position, wherein the slip ring module has the second conductor end, and wherein the first conductor end is formed by a winding end of a winding of the rotor;

moving the slip ring module, together with the contact element, toward the rotor into the end position.

According to one embodiment, the method comprises the step of:

realizing a connection by way of plastic deformation or inter alia by way of plastic deformation.

The contact element is expediently crimped to the conductor ends. The contact element is expediently of deformable design, or the fastening portions in which the conductor ends are arranged prior to the actual connection are of deformable design. Expediently, the contact element is designed such that, in the non-deformed state, it cannot be pushed into the end position, since it is supported for example via a correspondingly formed support element against a corresponding holding surface or a holding portion of the rotor. Only after the plastic deformation, in particular also in connection with the crimping, are the fastening portions deformed such that an arrangement in or on the rotor, for example in receptacle portions formed in an insulation of the rotor, is possible.

According to one embodiment, the method comprises the step of:

arresting or holding the contact element in the intermediate position with respect to the rotor.

The method furthermore advantageously comprises the step of:

deforming the contact element for the purpose of releasing the arresting action.

As already mentioned, it is in particular possible for the two aforementioned method steps to be realized ideally by crimping, in particular by hot crimping.

It should be mentioned at this juncture that the contact element is expediently formed from a metal material.

According to one embodiment, the method furthermore comprises the step of:

relieving the tension at least of the first conductor end(s), in particular of the winding ends, when the contact element is pushed from the intermediate position into the end position.

For this purpose, there is advantageously provided an extension or the like, which extends for example away from the rotor counter to the arrangement direction of the contact element and against which the first and/or the second conductor end can be supported such that, when the contact element is pushed in, no tensile forces act thereon. The extension is expediently formed such that the first conductor end is deflected in a suitable manner.

It should be mentioned at this juncture that the advantages and features mentioned in connection with the rotor apply analogously and correspondingly to the method, and vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
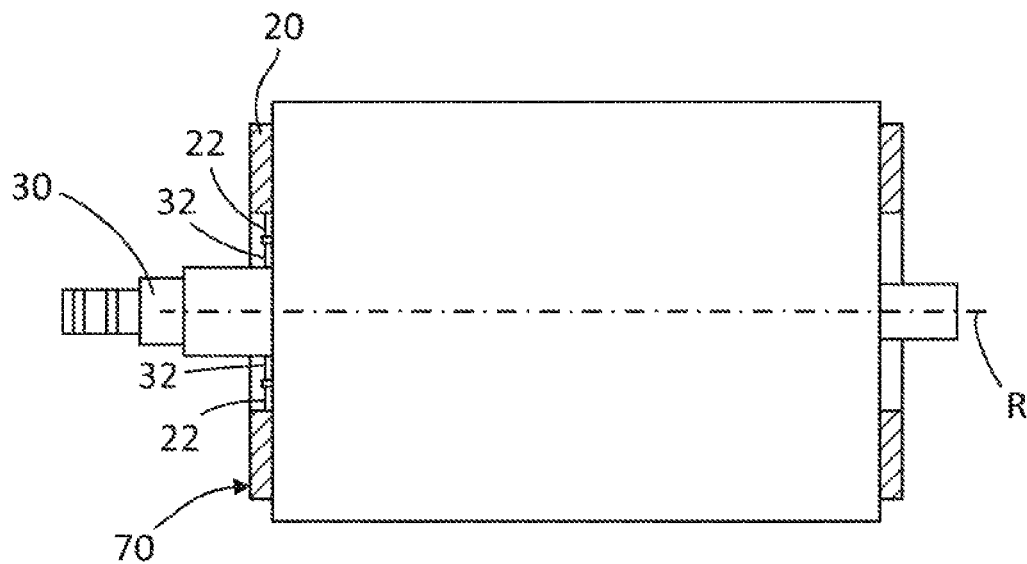
FIG. 1 shows a schematic side view of a rotor for explaining the problem.

FIG. 1 shows a side view of a rotor which extends along a rotor axis R. Said rotor is a wound rotor having a winding 20. Reference sign 30 denotes a slip ring module which, via two terminals 32, is connected in an electrically conductive manner to corresponding conductor ends 22 of the winding 20. It can clearly be seen that this connection is arranged very close to a rotor laminated core (not denoted in any more detail here) of the rotor. It is easily conceivable that, under these conditions, it is extremely difficult for the terminals 32 to be connected to the winding ends 22, in particular in large-series production.

Figure 2:
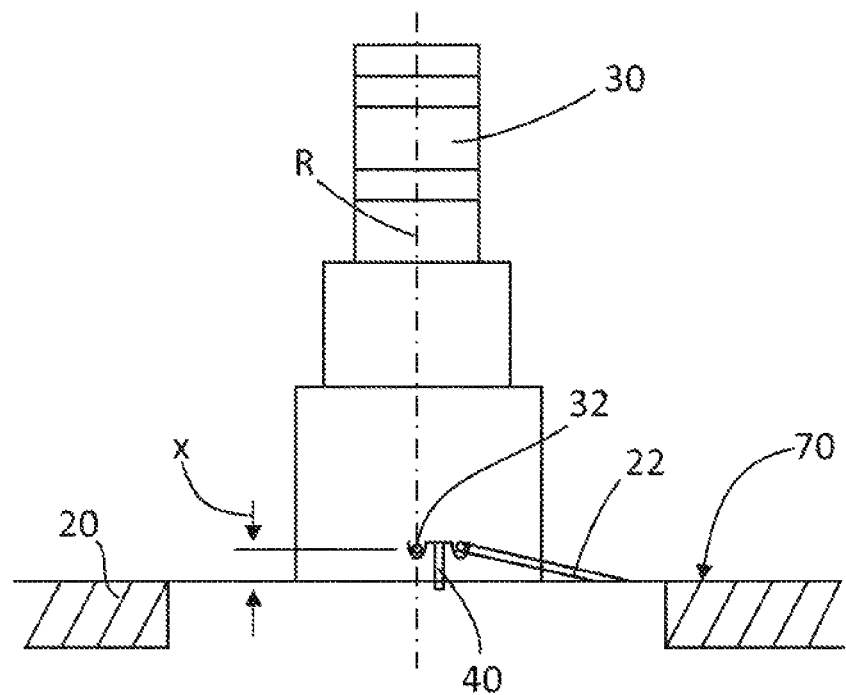
FIG. 2 shows a schematic partial view of a rotor in accordance with the present invention in an intermediate position.

FIG. 2 then shows, in a schematic illustration, substantially the rotor known from FIG. 1, this however being rotated such that one terminal 32 of a slip ring module 30 projects, as it were, out of the plane of the paper. Reference sign 22 denotes a winding end of a winding 20. As a special feature, it can then be seen that a connection or contacting between the terminal 32 and the winding end 22 is realized via a contact element 40. This is displaced by an offset x with respect to a reference surface 70. For the purpose of better orientation, the reference surface 70 is also depicted in FIG. 1. FIG. 2 shows, at least schematically, that significantly more space is available for the connection of the contact element 40 to, or the contacting thereof with, the terminal 32 or the winding end 22.

Figure 3:
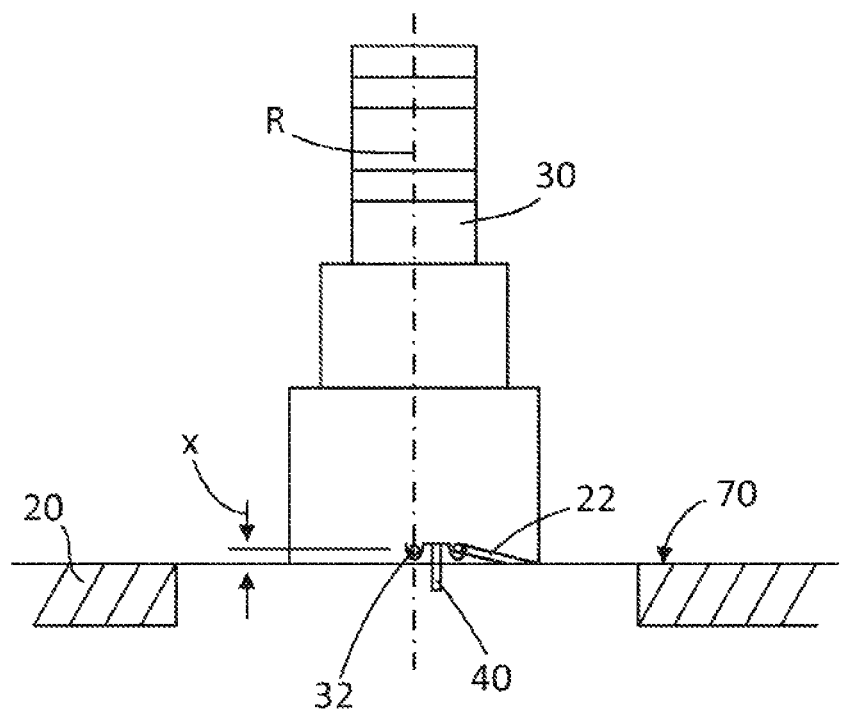
FIG. 3 shows a schematic partial view of the detail, known from FIG. 2, of a rotor in an end position.

FIG. 3 then shows the configuration known from FIG. 2 with the transition into an end position. In comparison with FIG. 2, an offset x with reference to the reference surface 70 has been reduced. As a consequence, two of the major advantages become clear, specifically that significantly more space is available for the contacting of the slip ring module 30 with, or the connection thereof to, the winding 20, and also the rotor as such requires very little structural space due to the pushing-together.

Figure 4:
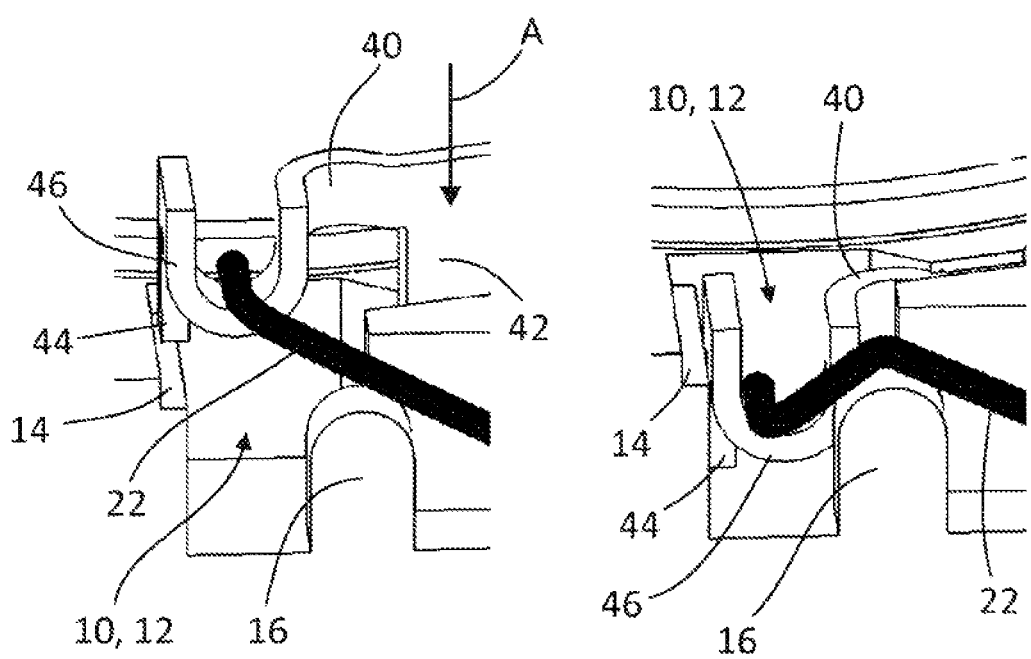
FIG. 4 shows two detail views of embodiments of a contact element in an intermediate position and in an end position in accordance with the present invention.

FIG. 4 shows two detail views of a contact element 40, in an intermediate position on the left, and in an end position on the right. The contact element 40 comprises a guide element 42, by means of which it is arranged in a receptacle 10, which is approximately slot-shaped at this position. The receptacle 10 furthermore has a receptacle portion 12 which serves for the arrangement of a fastening portion 46 of the contact element 40. The fastening portion 46 has substantially a U shape, with a first conductor end, in particular a winding end 22, being placed into this U or bowl shape. In the right-hand half of the figure, that is to say in the end position, the fastening portion 46 is advantageously deformed such that a support portion 44, which is provided for abutment against a holding portion or a holding surface 14, is no longer in abutment, whereby a displacement of the contact element 40 along an arrangement direction A (depicted by an arrow) in the direction of a rotor (not illustrated here) is possible. According to a preferred embodiment, the winding end 22 is crimped to the contact element 40, and in particular to the fastening portion 46, wherein the fastening portion 46 is in this case deformed. This is not illustrated in FIG. 4, however. This deformation may be configured such that, or the contact element 40 may be designed such that, only after the deformation is the fitting of the latter into the receptacle 10, or the arrangement thereof there, at all possible. Reference sign 16, furthermore, denotes an extension which is designed such that it effects a relief of tension when the contact element 40 or the winding end 22 is displaced along the arrangement direction A. Expediently, the receptacle 10, and the receptacle portion 12, the holding surface 14 and the extension 16, are formed in an insulation, in particular in an insulation applied on the end side, for example in a star-shaped-disk or face-disk insulation of the rotor, or are shaped there, for example by injection molding.

In the present case, only half of the contact element 40 is illustrated. However, this is expediently of symmetrical form and accordingly has two fastening portions 46. The other fastening portion (not illustrated here) is provided for example for the arrangement of a second conductor end, cf. for example FIG. 5 in this respect.

Figure 5:
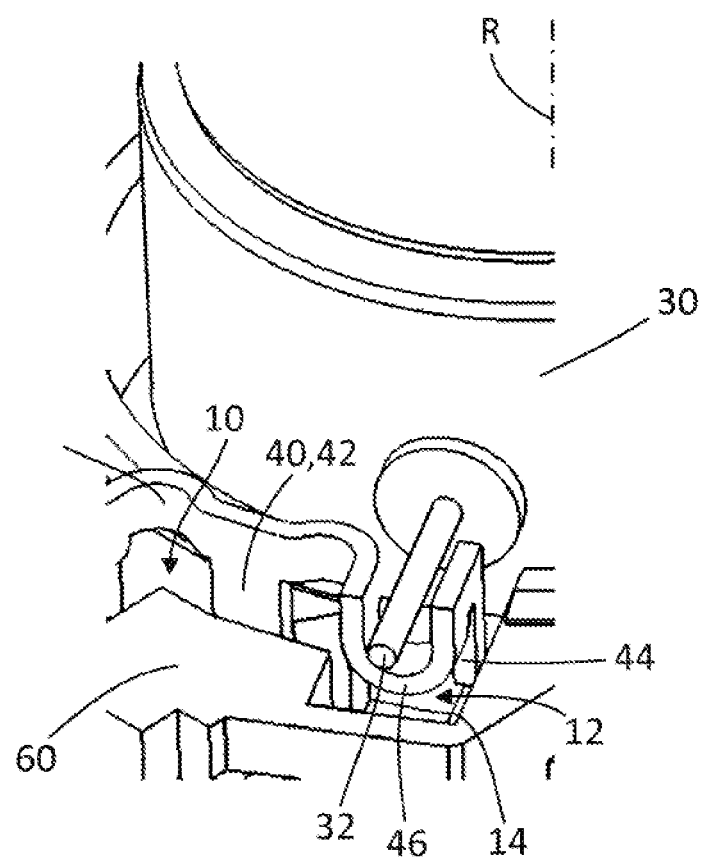
FIG. 5 shows a detail view of a contact element and of a slip ring module in an intermediate position in accordance with the present invention.

FIG. 5 shows a detail of a rotor in which a slip ring module 30 can be seen, said slip ring module having a second conductor end 32 or a terminal 32. For the purpose of better orientation, an axis of rotation R is shown. Reference sign 40 denotes essentially the contact element known from FIG. 4, wherein it can be seen how the guide surface 42 thereof engages into a receptacle 10, or is held there, wherein it is arranged in the receptacle 10 in a displaceable manner. An intermediate position is illustrated here too, in which intermediate position the terminal 32 is arranged in a fastening portion 46 of the contact element 40, wherein, in said intermediate position, the contact element 40 is still supported via a support element 44 against a correspondingly formed holding surface 14 such that inadvertent displacement toward the rotor is prevented. An arrangement of the fastening portion 46 into the receptacle portion 12 is realized after or during the connection of the contact element 40 to the terminal 32. The receptacle 10, along with its other formations, such as the receptable portion 12, holding surface 14, etc., is formed in an insulation 60 of the rotor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

10 Receptacle
12 Receptacle portion
14 Holding portion, holding surface
16 Extension
20 Winding
22 First conductor end, winding end
30 Slip ring module
32 Second conductor end, terminal
40 Contact element
42 Guide element
44 Support element
46 Fastening portion
60 Insulation
70 Reference surface R Rotor axis
x Offset
A Arrangement direction

What is claimed is:

1. A rotor for an electric machine, comprising:
at least one first conductor end and one second conductor end;
a contact element configured to provide a connection between the at least one first conductor end and one second conductor end, and
a face-side insulation configured to electrically insulate the contact element from an end of the rotor perpendicular to a rotation axis of the rotor,
wherein
the contact element is positionable along the rotation axis of the rotor in an intermediate position relative to an end position of the contact element, offset axially away from a winding of the rotor,
the contact element includes at least two fastening portions configured to receive a respective one of the at least one first conductor end and the one second conductor end,
the at least two fastening portions include a support element configured to cooperate with a holding portion of the face-side insulation to stop axial movement of the contact element at the intermediate position; and
the support element is configured such that during connection of the at least one first conductor end and the one second conductor end to the contact element, the support element is displaceable away from the holding portion of the face-side insulation such that the contact element is movable axially into the end position.

2. The rotor according to claim 1, wherein
the first conductor end is a winding end of the winding of the rotor, and
the second conductor end is a terminal of a slip ring module.

3. The rotor according to claim 2, wherein
the contact element includes a guide element arranged in a receptacle of the rotor.

4. The rotor according to claim 3, wherein
the at least two fastening portions of the contact element includes two fastening portions configured to receive respective ones of the first conductor end and the second conductor end, and
the fastening portions are deformable.

5. The rotor according to claim 4, wherein
the insulation member includes a receptacle, the receptacle having receptacle portions configured to receive respective ones of the fastening portions.

6. An electric motor, comprising:
a stator; and
a rotor, the rotor including at least one first conductor end and one second conductor end and a contact element configured to provide a connection between the at least one first conductor end and one second conductor end, and
a face-side insulation configured to electrically insulate the contact element from an end of the rotor perpendicular to a rotation axis of the rotor,
wherein
the contact element is positionable along the rotation axis of the rotor in an intermediate position relative to an end position of the contact element, offset axially away from a winding of the rotor, the contact element includes at least two fastening portions configured to receive a respective one of the at least one first conductor end and the one second conductor end,
the at least two fastening portions include a support element configured to cooperate with a holding portion of the face-side insulation to stop axial movement of the contact element at the intermediate position; and
the support element is configured such that during connection of the at least one first conductor end and the one second conductor end to the contact element, the support element is displaceable away from the holding portion of the face-side insulation such that the contact element is movable axially into the end position.

7. A method for producing a rotor, comprising the acts of:
winding a rotor, the rotor having at least one first conductor end and one second conductor end;
locating on a rotation axis of the rotor a face-side insulation configured to electrically insulate a contact element from an end of the rotor which is perpendicular to a rotation axis of the rotor,
connecting the at least two conductor ends to the contact element when the contact element is positioned in an axially intermediate position with respect to, the rotation axis of the rotor; and
displacing the contact element axially into an end position either during or after the connecting act,
wherein
the contact element includes at least two fastening portions configured to receive a respective one of the at least one first conductor end and the one second conductor end,
the at least two fastening portions include a support element configured to cooperate with a holding portion of the face-side insulation to stop movement of the contact element at the intermediate position; and
during the connecting act, the at least two fastening portions receive respective ones of the at least one first conductor end and the one second conductor end and the at least two support elements are displaced away from the holding portion of the face-side insulation such that the contact element is movable axially into the end position of the connect element during the displacing act.

8. The method according to claim 7, further comprising the acts of:
arranging a slip ring module on or against the rotor in the intermediate position, the slip ring module having the second conductor end;
moving the slip ring module together with the contact element axially toward the rotor winding into the end position,
wherein the first conductor end is formed by a winding end of a winding of the rotor.

9. The method according to claim 8, wherein:
during the connecting act the connecting of the at least two conductor ends is made by plastic deformation of the contact element.

10. The method according to claim 9, wherein
the contact element is held in the intermediate position prior to the act of moving into the end position.

11. The method according to claim 10, wherein the contact element is deformed during the displacing of the contact element into the end position.

\* \* \* \* \*